F. W. HANNA.
AUTOMATIC CONSTANT DISCHARGE WATER GATE.
APPLICATION FILED AUG. 5, 1908.

902,531.

Patented Oct. 27, 1908.

Witnesses:
John B. Beadle
Joseph H. Root

Inventor:
Frank W. Hanna

UNITED STATES PATENT OFFICE.

FRANK W. HANNA, OF DEFIANCE, IOWA, ASSIGNOR OF ONE-HALF TO JOSEPH H. ROOT, OF PORT BYRON, NEW YORK.

AUTOMATIC CONSTANT-DISCHARGE WATER-GATE.

No. 902,531.   Specification of Letters Patent.   Patented Oct. 27, 1908.

Application filed August 5, 1908. Serial No. 447,176.

*To all whom it may concern:*

Be it known that I, FRANK W. HANNA, a citizen of the United States, residing at Defiance, in the county of Shelby and State of Iowa, have invented a new and useful Improvement in Automatic Constant-Discharge Water-Gates, of which the following is a specification.

The invention relates to an automatic constant-discharge water gate producing in effect either a movable weir or a movable orifice of adjustable size and has for its object the automatic regulation and measurement of water discharged from canals, reservoirs or other receptacles for carrying or storing water.

This object is attained by means of a movable water gate mechanically connected with an intake receiving water from the fluctuating water surface of a canal or reservoir or other receptacle at an adjustable height above the discharge opening produced by the said gate and communicating by means of a telescoping pipe or pipes with a bucket likewise mechanically connected with the said gate and intake and provided with a water cushion for retarding accelerated motion of the operating mechanism and preventing excessive and unduly oscillating motion thereof.

Figure 1:
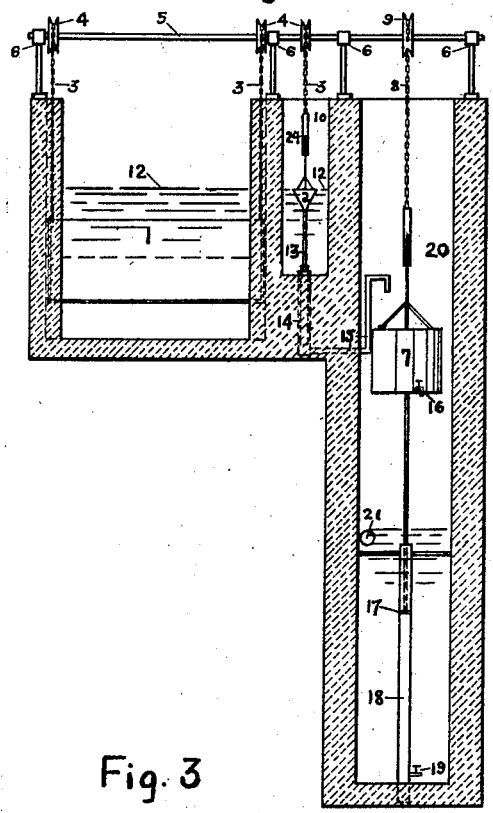
Figure 2:
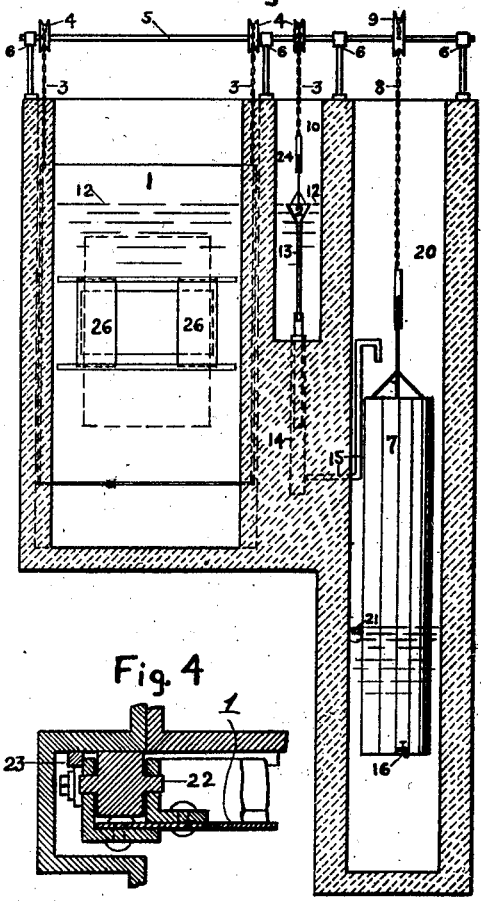
Figure 3:
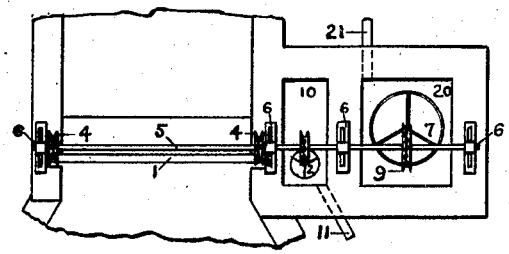
Figure 4:
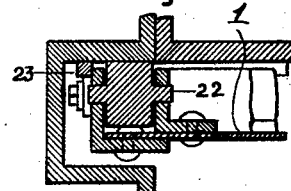
Figure 5:
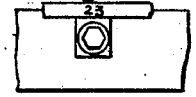
Figure 6:

In the accompanying drawing illustrating the invention, Figure 1 shows a section of the headworks of a movable weir water gate operated by the varying flow of water entering a suspended intake, the operating power being supplied by the weight of water in a bucket governed by an adjustable water cushion and the combined active weights of the gate and intake; Fig. 2 shows a section of the headworks of a movable orifice water gate operated by the varying flow of water entering a suspended intake, the operating power being supplied by the weight of water in a partially submerged bucket and the active weights of the gate and intake; Fig. 3 shows a plan of the devices shown in section in Figs. 1 and 2; and Figs. 4, 5 and 6 show the details of a suitable mechanism for reducing the amount of friction and leakage in connection with the gate.

In Figs. 1, 2 and 3 the water gate 1 and the suspended intake 2 having its top at an adjustable height above the discharge opening produced by the said gate are supported by chains 3 attached to equal sheaves 4 so mounted on a shaft 5 on fixed bearings 6 that rotation of the shaft will raise and lower the gate and the intake simultaneously; and the bucket 7 is likewise supported by a chain 8 attached to a sheave 9 so mounted on the same shaft that rotation thereof will cause the bucket to rise as the gate and intake fall, and conversely. The intake chamber 10 is connected by means of an opening 11 with the main canal or reservoir so that the water surface 12 in the intake chamber and that 12 in the main canal or reservoir are at the same elevation. The suspended intake has at the small end of the funnel portion a pipe or series of telescoping pipes 13 connecting with a vertical pipe 14 in the floor of the chamber that in turn connects with another pipe 15 discharging into the bucket 7 with the adjustable outlet 16. To the bottom of the bucket shown in Fig. 1 is attached an adjustable water cushion consisting of a piston 17 operating in a pipe 18 having a small adjustable discharge opening 19, the lower portion of the pipe being submerged. A portion of the bucket shown in Fig. 2 is submerged in the water of the bucket chamber, thus forming an open water cushion. The bucket chamber 20 shown in Figs. 1, 2 and 3 may be provided with a discharge opening 21 connected with the takeout canal or any other convenient channel for disposing of excess water: or the bucket and its water cushion may be inclosed in a water-tight compartment or well from which the excess water may be mechanically removed.

With the operating system in equilibrium. the common water surface in the main canal and intake chamber is slightly above the top of the intake and a constant small amount of water entering the intake flows through the connecting pipes, the bucket and the adjustable outlet at the bottom thereof. If the water surface in the main canal rises a larger amount of water will enter the intake than can be discharged through the outlet of the bucket thus increasing the weight of the contents of the bucket and causing the gate and intake to rise until the excess flow is stopped and equilibrium reëstablished. On the other hand if the water surface in the main canal falls the flow into the intake will diminish and the discharge from the bucket outlet will decrease the weight of the contents of the bucket thus permitting the gate and intake to descend of their own weight until the increasing flow into the intake again establishes equilibrium. The adjustable water cushion shown in Fig. 1 and the open water cushion shown in Fig. 2 will act as a retardant to accelerated motion of the operating mechanism and will prevent excessive and unduly oscillating motion thereof.

The term "constant discharge" is used herein not in its absolute but in its practical sense; and the perfection of the constancy of discharge will be facilitated by mounting the gate 1 shown in either of the Figs. 1, 2 or 3 in such a manner as to reduce to a minimum the friction arising from its operation. A satisfactory reduction of the friction may be secured by mounting the gate on wheels 22 as shown in Fig. 4 by a horizontal section through the gate and frame. Leakage around the gate may be reduced by the use of stanch rods 23 as shown in section in Figs. 4 and 6 and in plan in Fig. 5.

The use of the movable weir water gate or that of the movable orifice water gate depends upon the local necessity for taking water out of the main canal near the surface or at considerable depths below it. The discharge capacity of the weir water gate shown in Fig. 1 is varied through changing the height of the top of the intake above the crest of the weir by means of the adjusting rod and screw 24; and the discharge capacity of the orifice gate shown in Fig. 2 is varied through changing the height of the top of the intake above the center of the gate orifice by means of the adjusting rod and screw 24, and also through changing the size of the orifice by means of the sliding plates 26.

Having thus described my invention, I now make the following claims:

1. The combination of a movable water gate, an intake mechanically connected therewith receiving water from the fluctuating water surface of a canal or reservoir and a mechanism hydraulically operated by water received through the said intake and likewise mechanically connected with the said gate, the whole producing automatically a constant discharge from the said canal or reservoir.

2. The combination of a movable water gate equipped with wheels to reduce friction and provided with stanch rods to prevent leakage, an intake mechanically connected therewith receiving water from the fluctuating water surface of a canal or reservoir and a mechanism hydraulically operated by water received through the said intake and likewise mechanically connected with the said gate, the whole producing automatically a constant discharge from the said canal or reservoir.

3. The combination of a movable water gate, an intake mechanically connected therewith at an adjustable height above the bottom of the discharge opening produced by the said gate receiving water from the fluctuating water surface of a canal or reservoir and a bucket likewise mechanically connected with the said gate communicating by means of a telescoping pipe or pipes with the said intake and provided with an adjustable outlet and a water cushion, the whole producing automatically a constant discharge from the said canal or reservoir.

4. The combination of a movable water gate, an intake mechanically connected therewith at an adjustable height above the bottom of the discharge opening produced by the said gate receiving water from the fluctuating water surface of a canal or reservoir and a bucket likewise mechanically connected with the said gate communicating by means of a telescoping pipe or pipes with the said intake and provided with an adjustable outlet and an adjustable water cushion with an adjustable outlet, the whole producing automatically a constant discharge from the said canal or reservoir.

FRANK W. HANNA.

Witnesses:
 JOHN B. BEADLE,
 JOSEPH H. ROOT.